United States Patent
Kwon et al.

(10) Patent No.: US 7,366,418 B2
(45) Date of Patent: Apr. 29, 2008

(54) HIGH-SPEED WIRELESS PERSONAL AREA NETWORK SYSTEM FOR EXTENDING SERVICE AREA

(75) Inventors: Seo-Won Kwon, Suwon-shi (KR); Yun-Kyung Oh, Seoul (KR); Sang-Il Lee, Seoul (KR); Se-Youn Lim, Seoul (KR); Jong-Hun Lee, Suwon-shi (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 623 days.

(21) Appl. No.: 10/771,599

(22) Filed: Feb. 4, 2004

(65) Prior Publication Data

US 2005/0025487 A1 Feb. 3, 2005

(30) Foreign Application Priority Data

Aug. 1, 2003 (KR) ...................... 10-2003-0053506

(51) Int. Cl.
*H04B 10/12* (2006.01)
(52) U.S. Cl. .............................. 398/115; 398/72; 398/83
(58) Field of Classification Search .................. 398/67, 398/72, 83–85, 115, 121, 87, 91–94, 97, 180, 398/201
See application file for complete search history.

(56) References Cited

U.S. PATENT DOCUMENTS 5,282,257 A * 1/1994 Ota .............................. 385/46
5,615,290 A * 3/1997 Harasawa et al. ............. 385/24
6,034,966 A * 3/2000 Ota ............................. 370/443
2002/0147016 A1 10/2002 Arazi et al. .................. 455/443
2003/0076842 A1 4/2003 Johansson et al. ........... 370/401
2005/0026569 A1* 2/2005 Lim et al. ..................... 455/73
2005/0063414 A1* 3/2005 Kim et al. .................... 370/458

* cited by examiner

*Primary Examiner*—Leslie Pascal
(74) *Attorney, Agent, or Firm*—Cha & Reiter, LLC

(57) ABSTRACT

A high-speed WPAN (Wireless Personal Area Network) system for extending a service area includes an optical fiber serving as a medium for transmitting data; a plurality of pico-nets each including a plurality of devices and a PNC (Pico-Net Coordinator) device for managing the devices; a plurality of two-way signal converters corresponding to the pico-nets, each of the signal converters adapted for converting an optical signal received from the optical fiber into an electrical signal to transmit the electrical signal to the pico-nets, and for converting an electrical signal received from each of the pico-nets into an optical signal to transmit the optical signal to the optical fiber. A plurality of connectors are attached to the optical fiber and the signal converters for transmitting signals input from the optical fiber and the signal converters bidirectionally. One of the PNC devices provided in the pico-nets allocates and manages timeslots for all the devices located in the plurality of pico-nets, and the plurality of pico-nets may be operated as a single logical unit.

15 Claims, 6 Drawing Sheets

| INPUT | OUTPUT |
|-------|--------|
| 1 | 2, 3 |
| 2 | 1 |
| 3 | 1 |

FIG.3
(PRIOR ART)

| INPUT | OUTPUT |
|-------|--------|
| 1 | 2, 3 |
| 2 | 1, 3 |
| 3 | 1, 2 |

FIG.5

HIGH-SPEED WIRELESS PERSONAL AREA NETWORK SYSTEM FOR EXTENDING SERVICE AREA

CLAIM OF PRIORITY

This application claims priority to an application entitled "HIGH-SPEED WIRELESS PERSONAL AREA NETWORK SYSTEM FOR EXTENDING SERVICE AREA," filed in the Korean Intellectual Property Office on Aug. 1, 2003 and assigned Serial No. 2003-53506, the contents of which are hereby incorporated by reference.

BACKGROUND OF THE INVENTION

1. Field of the Invention

The present invention relates to a high-speed WPAN (Wireless Personal Area Network) based on IEEE (Institute of Electrical and Electronics Engineers) 802.15.3 using an Ultra Wide Band (UWB) frequency. More particularly, the present invention relates to a high-speed WPAN capable of extending a service area so that communication between devices located in different pico-nets can be enabled.

2. Description of the Related Art

Typically, wireless communication technologies that use an Ultra Wide Band (UWB) frequency can transmit communications at a distance of about 10 m~1 km when using a frequency band somewhere between 3.1 GHz to 10.6 GHz. For the past 40 years, the wireless communication technologies that used the UWB have been military wireless communication technologies in the US DOD (United States-Department of Defense). Recently, the FCC (Federal Communications Commission) opened the UWB frequency to the private sector.

Typically, the wireless communication technologies using the UWB frequency are often very high-speed wireless data transmission technologies based on the UWB of several GHz. In addition, these technologies typically have the characteristics of a high data rate (e.g., 500 Mbps~1 Gbps), and low electric power (e.g., $\frac{1}{100}$ of the electric power required for a mobile phone and a wireless LAN (Local Area Network)) when compared with existing IEEE 802.11 (Institute of Electrical and Electronics Engineers) and Bluetooth technologies. The wireless communication technologies operating in the UWB frequency range can be used in various fields, such as personal area networks that connect to computer systems, and peripheral devices. In addition, the operating frequency is also used by home appliances, for example, a very high-speed wireless Internet in a local area (e.g., an average distance of 10 m~20 m and a maximum distance of 100 m). UWB frequencies are used for "through-the-wall" radars for detection of objects behind walls of buildings, high-precision positioning and geolocation systems, vehicle collision avoidance sensors, mine detectors, loss prevention systems, detectors for detecting objects inside human bodies, etc.

IEEE 802.15.3 high-speed WPAN (Wireless Personal Area Network) standards have been proposed in terms presuming that wireless communication technologies in this filed will communicate using UWB frequencies. In terms of IEEE 802 standard, IEEE 802.15.1 is a working group for standardizing Bluetooth specifications, and IEEE 802.11 is a working group for standardizing wireless LANs. A working group for IEEE 802.15.3 is exploring the high-speed WPAN standardizations utilizing UWB frequencies.

As well-known PAN (Personal Area Network) technology, Bluetooth has now reached the stage of commercialization. The Bluetooth technology has been recently adopted and commercialized in a lot of products. IEEE 802.11 wireless LANs have been completely standardized, although it is true that periodically the standards are revised in accordance with changes in technology, innovations, etc. The above-described networks mostly use a frequency band of 2.4 GHz (e.g., an ISM (Industrial, Scientific and Medical) radio band), and are used as a PAN solution within the communication distance of 10 m.

IEEE 802.15.3 working groups include TG1 (Task Group 1), TG2 and TG3. The TG1 is conducting the standardization of Bluetooth specifications. The TG2 is analyzing technologies for facilitating coexistence of Bluetooth products and existing wireless LANs. As a group for standardizing high-data-rate PAN solutions, the TG3 is currently studying a transmission scheme for implementing a data rate of 55 Mbps or above.

FIG. 1 illustrates an exemplary pico-net formed between devices located in an IEEE 802.15.3 high-speed WPAN. As shown in FIG. 1, the pico-net forming the high-speed WPAN includes a plurality of communication devices 10, 12, 14, 16 and 18. Here, the pico-net is a unit of a network providing communication service in an independent high-speed WPAN.

Among the devices shown in FIG. 1, the device 10 acts as a PNC (Pico-Net Coordinator). The PNC device 10 manages communications of the devices located in the pico-net using beacon messages for synchronizing its own device with the first through fourth devices 12, 14, 16 and 18 respectively connected thereto. Furthermore, the PNC device 10 also performs an operation for controlling QoS (Quality of Service), a power save mode and a pico-net access.

An IEEE 802.15.3 device capable of acting as the PNC can form one pico-net. A procedure for forming a pico-net by the PNC-capable device is as follows:

The PNC device 10 searches for at least one channel to initiate the pico-net operation by selecting one of the channels not currently in use, and by broadcasting a beacon frame through the selected channel. In response to the broadcasted beacon frame, the devices 12, 14, 16 and 18 carry out a communication channel setup operation. At this time, the PNC device 10 allocates IDs (Identifiers or Identities) corresponding to the devices 12, 14, 16 and 18.

When an arbitrary device desires to join an already-formed pico-net, an arbitrary device performs an association procedure. In other words, the arbitrary device moving within transmission range of the pico-net from an external area requests that the PNC device 10 to connect its own device to the already-formed pico-net. In response to the request, the PNC device 10 allocates a single device ID usable in the pico-net to the arbitrary device making the request.

Through the aforementioned procedure, the pico-net is formed as shown in FIG. 1. When the devices 12, 14, 16 and 18 desires to transmit data, the devices 12, 14, 16 and 18 request that the PNC device 10 also transmits data. In response to the data transmission requests from the devices 12, 14, 16 and 18, the PNC device 10 allocates timeslots for enabling data communications to the devices 12, 14, 16 and 18 by using the beacon frame. Consequently, each of the devices 12, 14, 16 and 18 performs a data transmission operation during a time corresponding to an allocated timeslot.

On the other hand, where an arbitrary device desires to terminate a communication operation within the pico-net or where the PNC device 10 desires to release a communication connection with the arbitrary device, a disassociation procedure between the PNC device 10 and the arbitrary device is performed. Thus, the PNC device 10 deletes information of the registered arbitrary device through the pico-net disassociation procedure.

Conventionally, the high-speed WPAN is a small-sized network for physically providing communication service within an approximately 10 m radius. As the high-speed WPAN capable of providing wireless service of 100 Mbps or above based on the wireless communication technology using the UWB frequencies has been developed, there still exists a need in the art to extend the service area to beyond the approximately 10 m radius that is the current limit.

Since transmission outputs are limited to −41.3 dBm or below (e.g., a frequency band of 3.1 GHz~10.6 GHz) so that interference associated with an existing frequency band can be minimized, there still exists a problem in that the physical service area is limited to within the approximately 10 m radius, despite the fact that wireless communications in the high-speed WPAN utilize the UWB frequencies for wireless communications.

Communications between high-speed WPANs that are separate from each other cannot be supported by the IEEE 802.15.3 protocol. In other words, one PNC (Pico-net Coordinator) device is located in one pico-net, and the PNC device is responsible only for communications between devices within the same pico-net. However, the PNC device cannot communicate with a PNC device located in another pico-net.

The pico-net formed between the PNC device 10 and the devices 12, 14, 16 and 18 shown in FIG. 1 is classified into (1) an independent pico-net capable of independently allocating timeslots to the devices that are located within the pico-net, and (2) a dependent pico-net capable of distributing and allocating timeslots provided from a PNC device located outside the pico-net to the devices located in the pico-net. If at least one dependent pico-net is newly generated in an independent pico-net, then the independent pico-net is referred to as a "parent pico-net", and the newly generated dependent pico-net is referred to as a "child pico-net" or "neighbor pico-net". That is, the independent pico-net becomes the parent pico-net, and the dependent pico-net becomes the child pico-net. In this case, the child pico-net (or dependent pico-net) uses a common channel provided from the PNC device located in the parent pico-net.

Services between the parent and child pico-nets are provided using divided bandwidths. The result of using divide bandwidths is that a data transfer function cannot be performed between the parent and child pico-nets. Thus, communications between different pico-nets, i.e., communications between devices located in the different pico-nets, cannot be supported. To support the communication between the devices located in the different pico-nets, an IEEE 802.15.3 MAC (Media Access Control) bridge must be newly defined and implemented for all the devices. Furthermore, to support the communication between the devices located in the different pico-nets, a physically wired connection structure such as an optical fiber or a UTP (Unshielded Twisted Pair) cable must be configured, and an AP (Access Point) must be newly defined as in the high-speed WPAN.

FIG. 2 is a view illustrating the architecture of an exemplary high-speed WPAN using an optical fiber. It should be noted that the devices shown in FIG. 2 can use the communication protocol in the high-speed WPAN that is defined by IEEE 802.15.3.

As shown in FIG. 2, the conventional high-speed WPAN includes a central entity 20, a plurality of optical couplers 22, 24 and 26, a plurality of signal converters 31, 41 and 51 and a plurality of pico-nets 30, 40 and 50.

The central entity 20 performs a path setup function so that data can be switched and transmitted from the pico-nets 30, 40 and 50 to the destination devices. The plurality of optical couplers 22, 24 and 26 transmit the data from the central entity 20 to a connected path, and transmit the data from the pico-nets 30, 40 and 50 to the central entity 20.

The plurality of signal converters 31, 41 and 51 convert the optical signals that are received from the central entity 20 via the optical couplers 22, 24 and 26. The optical couplers connect the electrical signals and broadcast the electrical signals to corresponding pico-nets. Furthermore, the signal converters 31, 41 and 51 convert electrical signals received from devices of the pico-nets 30, 40 and 50 into optical signals, and then transmit the optical signals to the central entity 20.

The plurality of pico-nets 30, 40 and 50 include a plurality of PNC devices 32, 42 and 52 (one per pico-net), and a plurality of devices 33 to 37, 43 to 47 and 53 to 57 for transmitting data on the basis of timeslots allocated by the PNC devices 32, 42 and 52 that belong to the pico-nets 30, 40 and 50.

When communications are performed between the devices located in the different pico-nets in the high-speed WPAN architecture shown in FIG. 2, the central entity 20 receives data and transmits the received data to the destination pico-nets because the optical couplers 22, 24 and 26 cannot directly transmit the data to the destination pico-nets. The central entity 20 must have a PNC function for managing all the devices 33 to 37, 43 to 47 and 53 to 57 located in the respective pico-nets 30, 40 and 50 connected thereto through the optical fiber. Furthermore, there is a problem in that the central entity 20 must have a MAC bridge function necessary for switching and transmitting data from a source pico-net to a destination pico-net.

FIG. 3 is a table that lists data input and output states between the central entity 20 and the pico-net-A 30 in terms of the optical coupler-A 22 shown in FIG. 2. As shown in FIG. 3, it is assumed that "1", "2" and "3" denote a path of the central entity 20, a path of the optical coupler-B 24 and a path of the pico-net-A 30, respectively, in terms of the optical coupler-A 22. Data inputted into the optical coupler-A 22 from the path of the central entity 20, i.e., the "1" path, are outputted to the "2" and "3" paths. Data input from the "2" path is output to the "1" path over the optical coupler-A 22, and data input from the "3" path is output to the "1" path over the optical coupler-A 22.

For example, when data is transmitted from the pico-net-C 50 to an arbitrary device located in the pico-net-B 40, a signal that has been opto-electrically converted by the signal converter-C 51 is not directly transmitted to the pico-net-B 40 over the optical coupler-C 26, but is transmitted to the central entity 20. The central entity 20 broadcasts the received signal to the pico-nets 30, 40 and 50 over the MAC bridge function. At this time, the devices 33 to 37, 43 to 47 and 53 to 57 located in the pico-nets 30, 40 and 50 analyze ID (Identifier or Identity) information of the data that is broadcast from the central entity 20 and then received from the signal converters 31, 41 and 51, and determine whether the received data corresponds to their own devices, respectively.

In order for data to be transmitted between different pico-nets as described above, the data must be transmitted to the central entity 20 and subsequently be transmitted to a destination pico-net. Thus, there is a drawback in that the conventional high-speed WPAN must perform additional operations involving the central entity.

SUMMARY OF THE INVENTION

Therefore in view of the aforementioned problems in the art, the present invention provides a high-speed WPAN (Wireless Personal Area Network) capable of simply and quickly transmitting data between any devices located in different pico-nets.

The present invention also provides a high-speed WPAN (Wireless Personal Area Network) capable of directly transmitting data between any devices located in different pico-nets without involving use of a central entity.

The present invention also provides a high-speed WPAN (Wireless Personal Area Network) for enabling two-way communications between any devices located in different pico-nets.

In accordance with the present invention, the above and other functions can be accomplished by the provision of a high-speed WPAN (Wireless Personal Area Network) system, comprising: an optical fiber serving as a medium for transmitting data; a plurality of pico-nets each including a plurality of devices and a PNC (Pico-Net Coordinator) device for managing the devices; a plurality of signal converters corresponding to the pico-nets, each of the signal converters converting an optical signal received from the optical fiber into an electrical signal to transmit the electrical signal to the pico-nets, and converting an electrical signal received from each of the pico-nets into an optical signal to transmit the optical signal to the optical fiber. A plurality of connectors attached to the optical fiber and the signal converters transmit signals input from the optical fiber and the signal converters bidirectionally, wherein one of PNC devices provided in the pico-nets allocates and manages timeslots for devices located in the pico-nets.

Preferably, each of the connectors may comprise: a first coupler connected to one side of the optical fiber; a second coupler connected to the other side of the optical fiber; and a third coupler connected to the signal converter, wherein the first, second and third couplers drop/add inputted signals.

Preferably, each of the first, second and third couplers may comprise: a first port at one side thereof; and second ports at the other side thereof. Each of the first, second and third couplers may drop and transmit a signal inputted from the first port to the second ports, and may add and transmit signals input from the second ports to the first port.

Preferably, first ports of the first and second couplers may be connected to the optical fiber, and the first port of the third coupler may be connected to the signal converter. Preferably, the second ports at each of the first, second and third couplers may be mutually connected to second ports of neighboring couplers by common lines. Preferably, the one PNC device managing the devices located in the pico-nets may manage the pico-nets as a single logical pico-net.

Preferably, a higher-order device of PNC capable devices may be set as a PNC device when the one PNC device managing the devices located in the pico-nets is outside the single logical pico-net.

As pico-nets and an optical fiber are connected to one another to perform two-way communications in accordance with the present invention, data from the pico-nets is dropped and transmitted bidirectionally, so that communications between the devices located in the different pico-nets can be performed. Further, as the communications between the devices located in the different pico-nets can be performed, a physical service area can be extended in a high-speed WPAN (Wireless Personal Area Network). Furthermore, since data from an arbitrary device can be transmitted to the devices located in the different pico-nets, the physically different pico-nets can be logically integrated into a single pico-net as it can be seen that the high-speed WPAN is configured by the single pico-net.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a table illustrating data input and output states between a central entity and a pico-net-A in terms of an optical coupler-A shown in FIG. 2;

FIG. 5 is a table illustrating data input and output states in terms of a connector-A shown in FIG. 4.

DETAILED DESCRIPTION OF THE PREFERRED EMBODIMENTS

Figure 1:
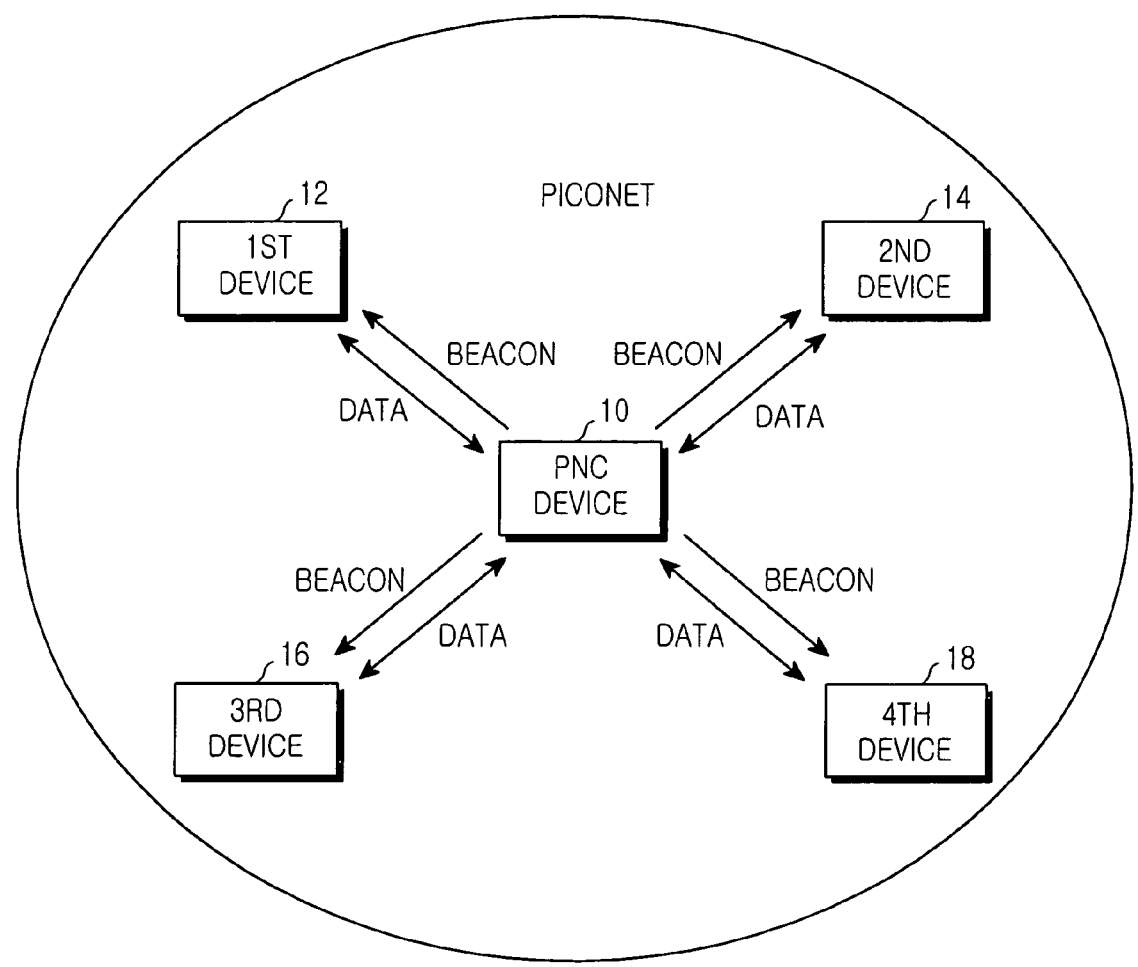
FIG. 1 is a view illustrating an exemplary pico-net formed between devices located in an IEEE 802.15.3 high-speed WPAN (Wireless Personal Area Network)
Figure 2:
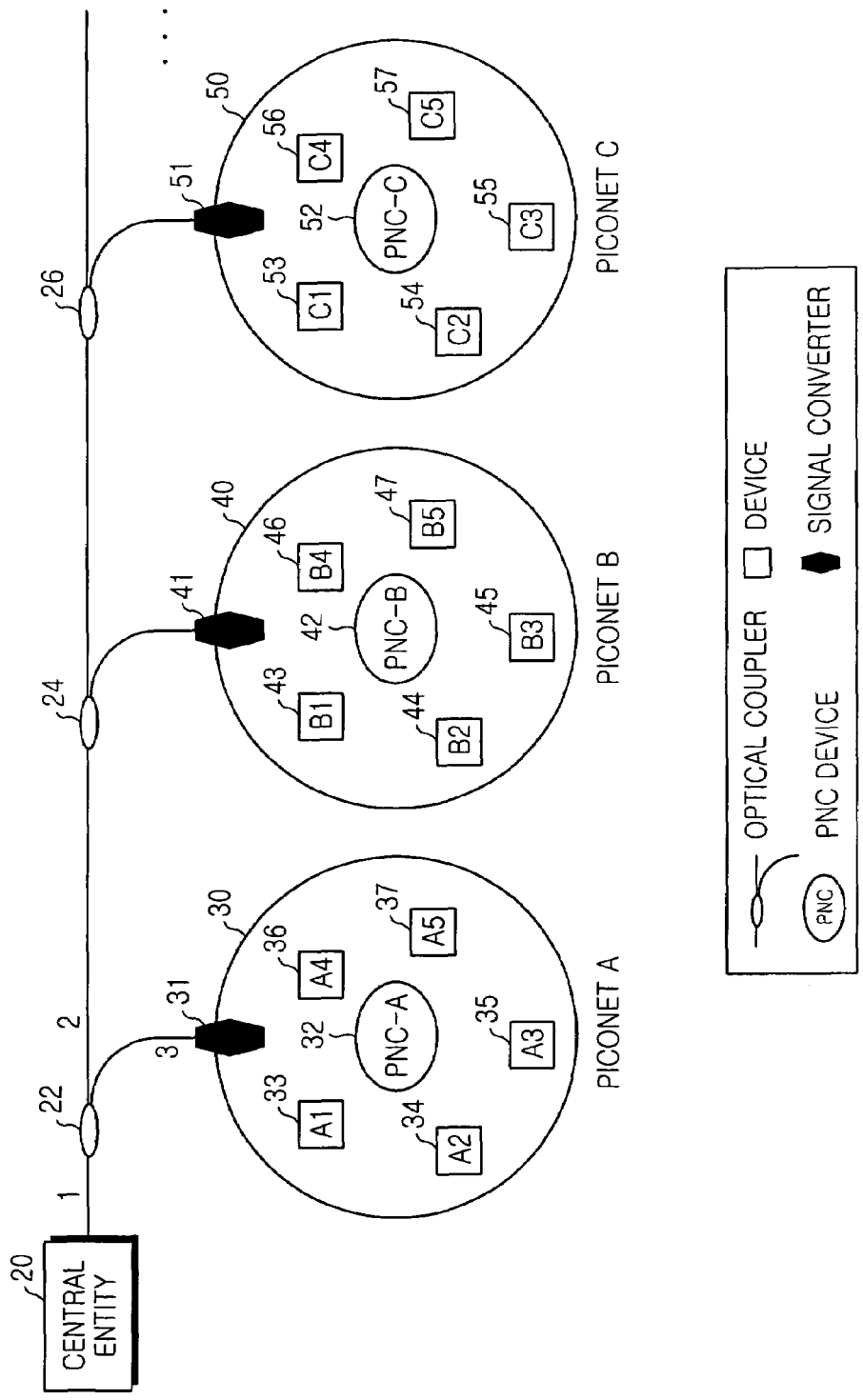
FIG. 2 is a view illustrating the architecture of an exemplary high-speed WPAN using an optical fiber.

Now, preferred aspects of the present invention will be described in detail with reference to the annexed drawings. In the drawings, the same or similar elements are denoted by the same reference numerals even though they are depicted in different drawings. In the following description made in conjunction with preferred aspects of the present invention, a variety of specific elements are shown. The description of such elements has been made only for a better understanding of the present invention. Those skilled in the art will appreciate that the present invention can be implemented without using the above-mentioned specific elements, yet still reside within the spirit of the invention and the scope of the appended claims. Finally, in the following description, a detailed description of known functions and configurations incorporated herein will be omitted when it may obscure the subject matter of the present invention.

Figure 4:
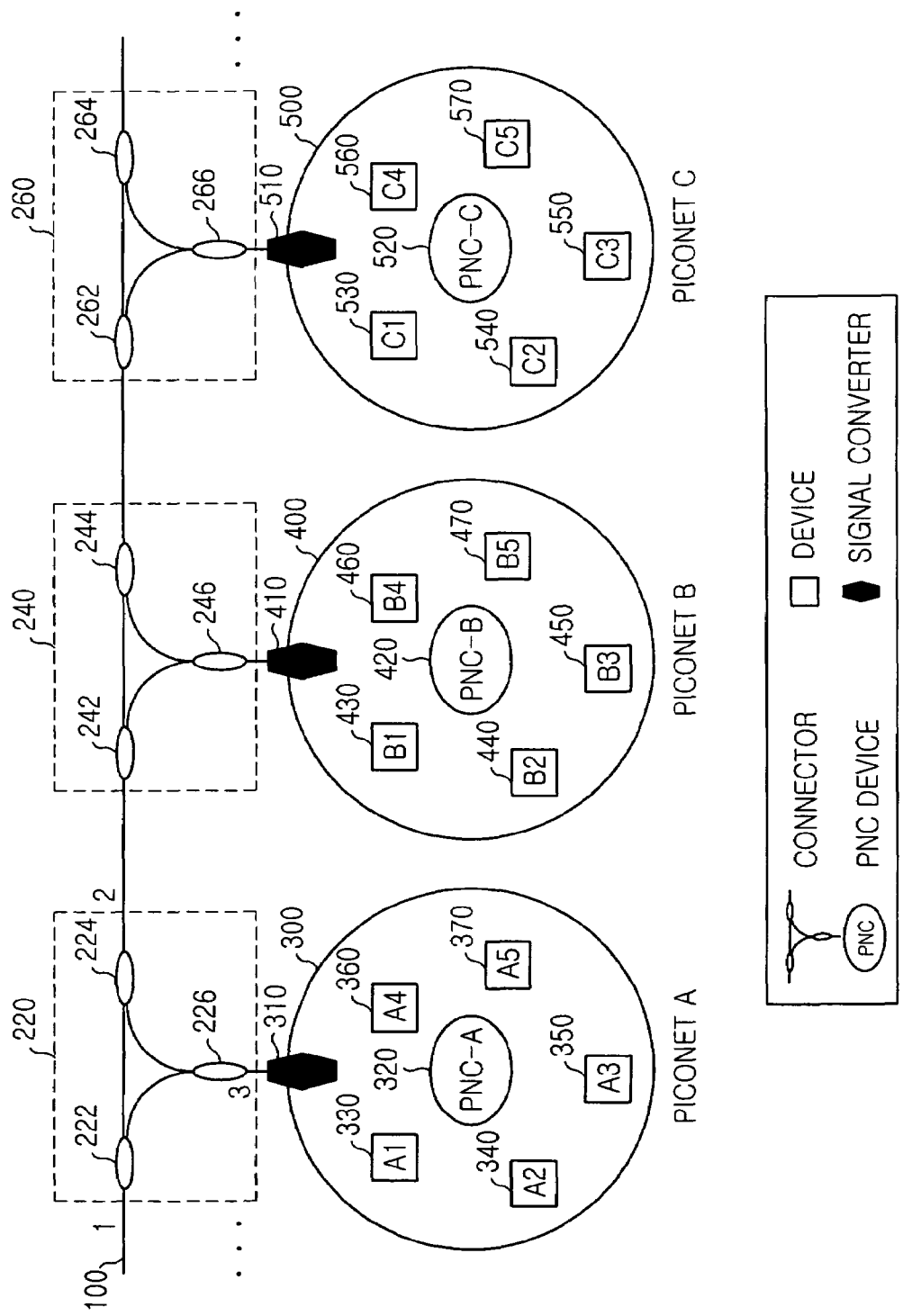
FIG. 4 is a view illustrating the architecture of a high-speed WPAN (Wireless Personal Area Network) system in accordance with a preferred embodiment of the present invention.

FIG. 4 illustrates the architecture of a high-speed WPAN (Wireless Personal Area Network) in accordance with a preferred aspect of the present invention. As shown in FIG. 4, the high-speed WPAN includes an optical fiber serving as a transfer medium, a plurality of pico-nets 300, 400 and 500 having respective signal converters 310, 410 and 510, and a plurality of connectors 220, 240 and 260.

The plurality of pico-nets 300, 400 and 500 includes a plurality of respective PNC devices 320, 420 and 520, and a plurality of respective devices 330 to 370, 430 to 470 and 530 to 570 per pico-net. Here, the PNC devices 320, 420 and 520 manage the devices located in the pico-nets formed thereby.

The plurality of signal converters 310, 410 and 510 convert optical signals received from the optical fiber 100 into electrical signals and then broadcast the electrical signals to the pico-nets 300, 400 and 500, respectively.

Furthermore, the signal converters 310, 410 and 510 also convert electrical signals received from devices of the pico-nets 300, 400 and 500, into optical signals, and then transmit the optical signals to the optical fiber 100.

The connectors 220, 240 and 260 connect the pico-nets 300, 400 and 500 to the optical fiber 100 and transmit data in the both directions, respectively. Thus, upon receiving data from one side of the optical fiber 100, the connectors 220, 240 and 260 drop and transmit the received data to the other side of the optical fiber 100 and the pico-nets 300, 400 and 500. Further, upon receiving data from the other side of the optical fiber 100, the connectors 220, 240 and 260 drop and transmit the received data to the one side of the optical fiber 100 and the pico-nets 300, 400 and 500. Furthermore, upon receiving data from the pico-nets 300, 400 and 500, the connectors 220, 240 and 260 drop and transmit the received data to the one and other sides of the optical fiber 100, respectively.

As described above, the data is dropped and transmitted bidirectionally over the optical fiber 100 when data is transmitted from the pico-nets, such that communication between the devices located in the different pico-nets can be enabled. As the communication between the devices located in the different pico-nets is enabled, a physical service area can be extended in the high-speed WPAN.

On the other hand, one of the PNC devices 320, 420 and 520 forming the pico-nets 300, 400 and 500 of this aspect of the invention allocates and manages timeslots not only for devices that form its own pico-net, but also for devices including other PNC devices that have formed other pico-nets connected to the optical fiber. In accordance with this aspect of the invention, the PNC-A device 320 of the PNC devices 320, 420 and 520 is set as a device adapted to perform a PNC function not only for its own pico-net but also for other pico-nets.

Figure 3:
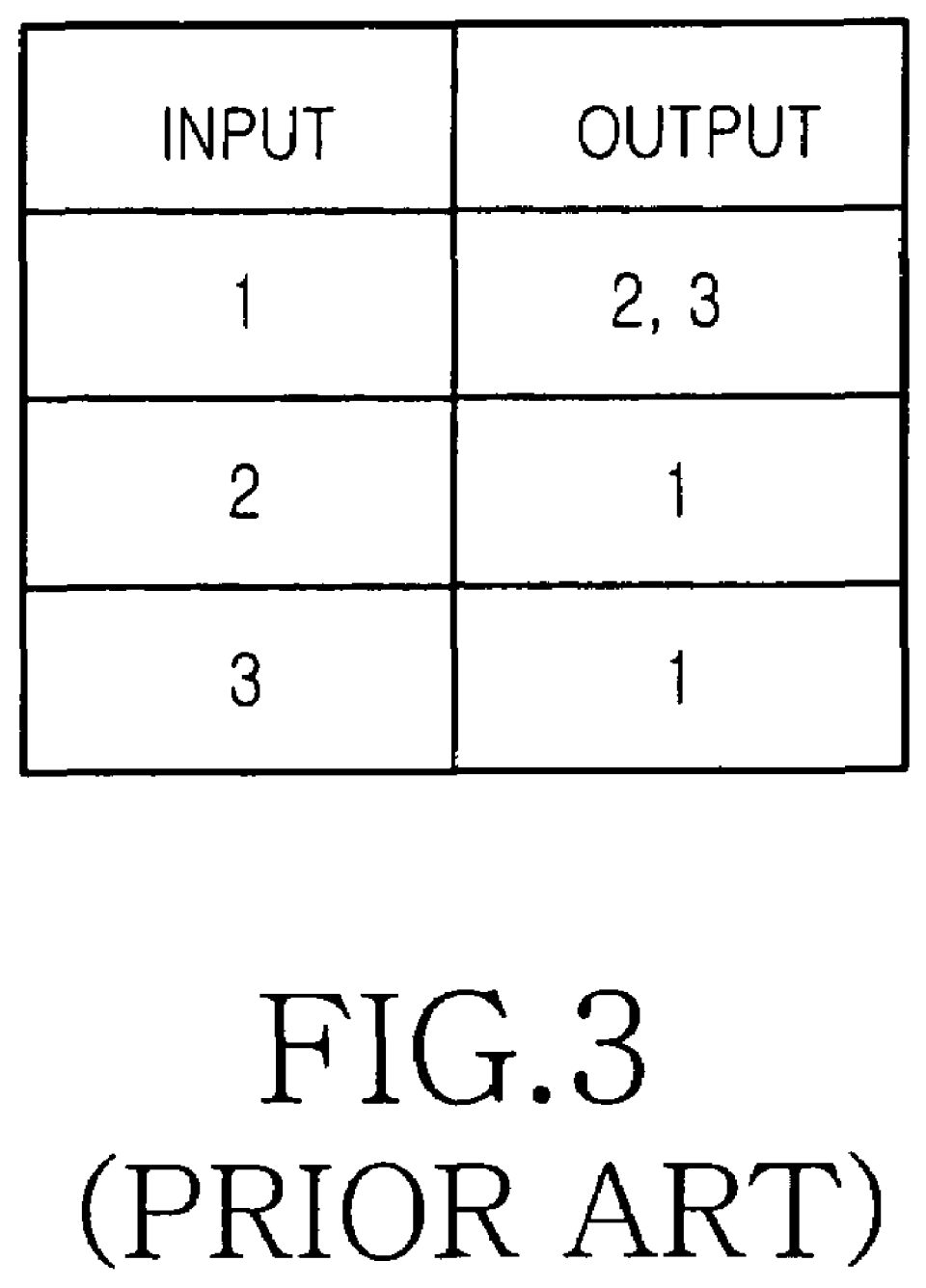
Figure 5:
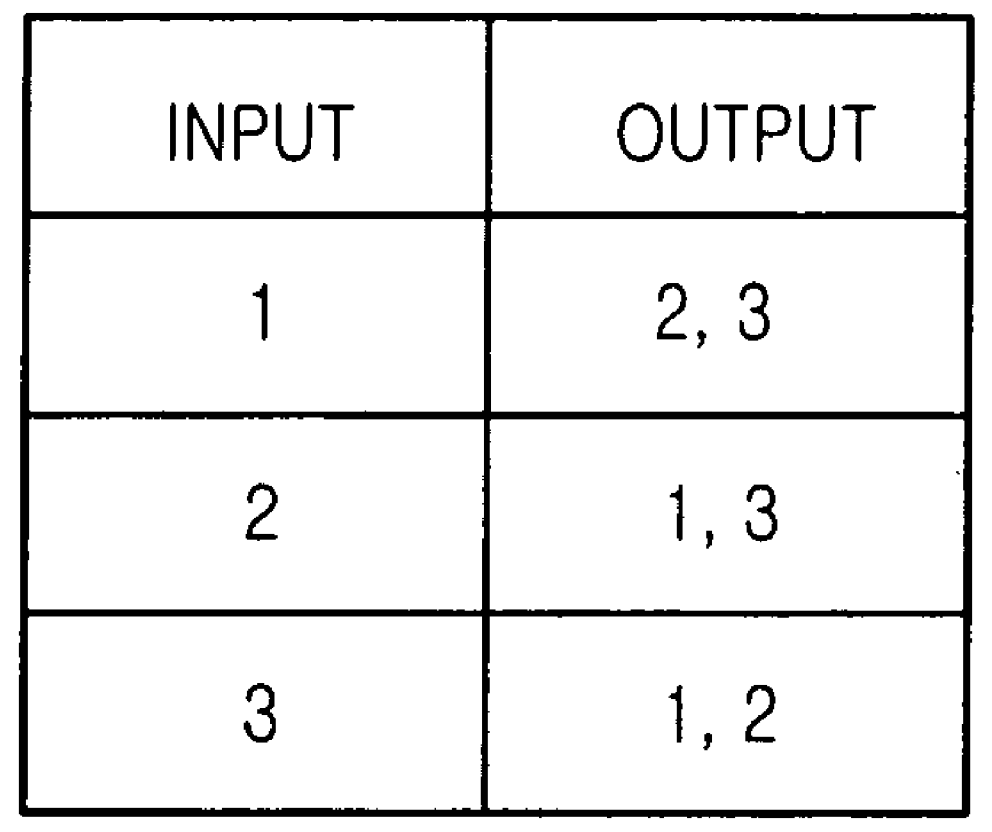

FIG. 5 is a table illustrating data input and output states in terms of the connector-A 220 shown in FIG. 4. Compared with the prior art table shown in FIG. 3, there is a significant advantage in the possible outputs for a given input. As shown in FIG. 5, when data is input from one side 1 of the optical fiber 100, the data is transmitted to the other side 2 of the optical fiber 100 and the pico-net-A 300 by the connector-A 220. Further, when data is inputted from the other side 2 of the optical fiber 100, the input data is transmitted to the one side 1 of the optical fiber 100 and the pico-net-A 300 by the connector-A 220. Furthermore, data is input from the pico-net-A 300, and the input data is transmitted to the one and other sides 1 and 2 of the optical fiber 100 by the connector-A 220. Thus, when data is input from any direction, the input data is transmitted bidirectionally. The above-described configuration can be identically applied to other connectors 240 and 260.

The connector-A 220 shown in FIG. 4 includes the first coupler 222, the second coupler 224 and the third coupler 226. Furthermore, the connector-B 240 includes the first coupler 242, the second coupler 244 and the third coupler 246, and the connector-C 260 includes the first coupler 262, the second coupler 264 and the third coupler 266. The couplers formed within the connectors 220, 240 and 260 perform the same function. Thus, the couplers 222, 224 and 226 configuring the connector-A 220 will be exemplarily described in this embodiment.

The first coupler 222, which is connected to one side of the optical fiber 100, drops and transmits input data to the second and third couplers 224 and 226. The second coupler 224, which is connected to the other side of the optical fiber 100, drops and transmits inputted data to the first and third couplers 222 and 226. The third coupler 226, which is coupled to the devices of the pico-net-A 300 and the signal converter-A 310 adapted for performing a data transmitting and receiving operation, drops and transmits data inputted from the pico-net-A 300 to the first and second couplers 222 and 224.

Each of the first, second and third couplers 222, 224 and 226 includes the first port at one side thereof and a pair of second ports at the other side thereof. Thus, each of the first, second and third couplers 222, 224 and 226 drops and transmits data input from the first port to the pair of second ports, and adds and transmits data input from the second ports to the first port.

Here, the first ports of the first and second couplers 222 and 224 are connected to the optical fiber 100. In addition, the first port of the third coupler 226 is connected to the signal converter-A 310 for performing communication with the devices of the pico-net-A 300. Furthermore, the second ports at each of the first, second and third couplers 222, 224 and 226 are mutually connected to the second ports of the neighboring couplers by common lines. In other words, one line connected to one of the second ports of the first coupler 222 is commonly connected to one of the second ports of the second coupler 224. The other line connected to the other of the second ports of the first coupler 222 is commonly connected to one of the second ports of the third coupler 226. A line connected to the other of the second ports of the second coupler 224 is commonly connected to the other of the second ports of the third coupler 226.

A procedure for transmitting data from the device-A1 330 to the device-B1 430 will be briefly described with reference to FIG. 4. In accordance with this aspect of the present invention, the device-A1 330 generates data to be transmitted to the device-B1 430 being the destination on the basis of device ID information from the PNC-A device 320 performing the PNC function, and then transmits the generated data to the signal converter-A 310.

The signal converter-A 310 converts the data received from the device-A1 330 into an optical signal, and then transmits the optical signal to the third coupler 226 of the connector-A 220. The third coupler 226 drops and transmits the optical signal to the first and second couplers 222 and 224. The first and second couplers 222 and 224 transmit the optical signal to the one and other sides of the optical fiber 100, respectively.

The first coupler 242 of the connector-B 240 drops and transmits data input from the connector-A 220 to the second and third couplers 244 and 246. The second coupler 244 of the connector-B 240 transmits the data from the first coupler 242 to the connector-C 260 over the optical fiber 100. The third coupler 246 of the connector-B 240 transmits the data from the first coupler 242 to the signal converter-B 410. The signal converter-B 410 converts the data received from the third coupler 246 into an electrical signal and then broadcasts the electrical signal to the devices 420 to 470 located in the pico-net-B 400. The devices 420 to 470 analyze ID and address information contained in the electrical signal broadcast by the signal converter-B 410 and then determine whether the ID and address information corresponds to their own devices, respectively. If the device-B1 430 determines that the received electrical signal corresponds to its own device, it performs a subsequent signal processing operation. Otherwise, other devices 420, 440, 450, 460 and 470 discard the received electrical signal from converter 410 because the data signal is not associated with their own devices.

Figure 6:
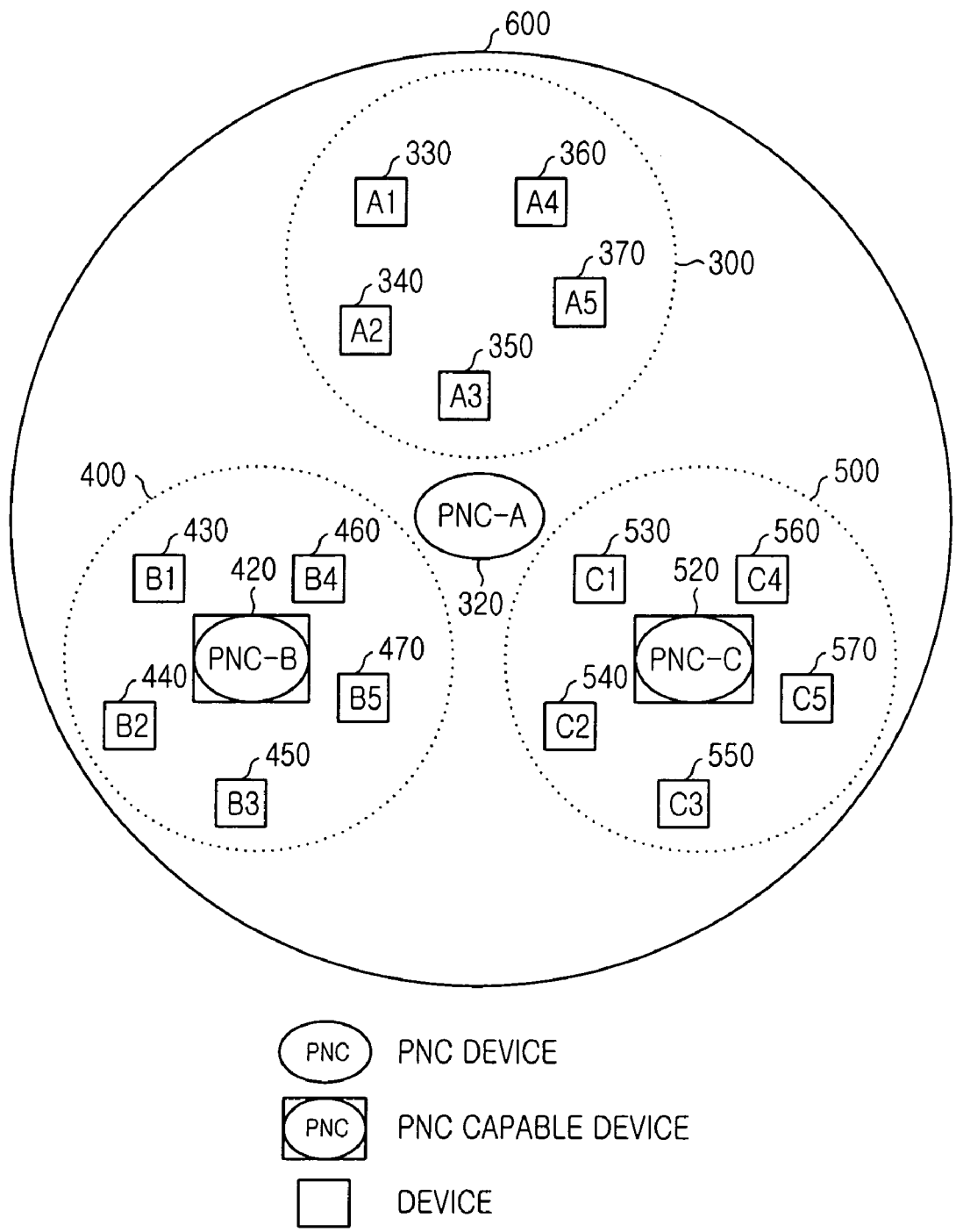
FIG. 6 is a view illustrating an exemplary architecture for logically reconfiguring the relationship between pico-nets shown in FIG. 4.

FIG. 6 illustrates exemplary architecture for logically reconfiguring the relationship between the pico-nets 300, 400 and 500 shown in FIG. 4. In FIG. 6, the PNC-A device 320 of the pico-net-A 300 for allocating and managing timeslots for the devices of all the pico-nets 300, 400 and 500 becomes the PNC device for all of the devices arranged in the pico-nets 300, 400 and 500.

In this case, the PNC-B device 420 of the pico-net-B 400 and the PNC-C device 520 of the pico-net-C 500 have a PNC function, but do not actually perform the PNC function. Since the PNC-B and PNC-C devices 420 and 520 perform communications using timeslots allocated by the PNC-A device 320, they are referred to as "PNC capable devices". Furthermore, since the pico-nets 300, 400 and 500 are integrated and managed by the PNC-A device 320, the high-speed WPAN of this embodiment can be expressed as a pico-net 600 into which the pico-nets 300, 400 and 500 are integrated and formed.

Data from an arbitrary device can be transmitted to a destination device located in a different pico-net, such that it can be seen that the devices located in physically different pico-nets may operate within a single logical pico-net. Furthermore, as paths are set up so that two-way communications between the devices located in the different pico-nets are enabled using couplers, the communication service area can be extended without changing a MAC layer for transmitting data between the devices located in the different pico-nets and adding a MAC bridge function.

The PNC devices 320, 420 and 520 are physically located in the pico-nets 300, 400 and 500 according to the high-speed WPAN shown in FIG. 4. In accordance with this embodiment, it can be seen that the devices logically operate within a single pico-net. Thus, if the PNC-A device 320 is outside the pico-net 600, a higher-order device of the PNC-B device 420 and PNC-C device 520 is automatically set as the PNC device of the pico-net 600. This operation is defined by IEEE 802.15.3.

As pico-nets and an optical fiber are connected to one another to perform two-way communications, data from the pico-nets is dropped and transmitted bidirectionally and hence communications between the devices located in the different pico-nets can be performed.

Furthermore, as the communications between the devices located in the different pico-nets can be performed, a physical service area can be extended in a high-speed WPAN (Wireless Personal Area Network).

Finally, it should be understood that data from an arbitrary device can be transmitted to the devices located in the different pico-nets, and the physically different pico-nets can be logically integrated into a single pico-net as it can be seen that the high-speed WPAN is configured by the single pico-net. While it is preferred that one designated PNC manages the timeslots, etc. of all the devices in the plurality of pico-nets as a single logical unit, it is within the spirit and scope of the claimed invention that there could be a device located within the pico-net that is not managed by the designated PNC Finally, although the preferred aspects of the present invention have been disclosed for illustrative purposes, those skilled in the art will appreciate that various modifications, additions and substitutions are possible, without departing from the scope of the invention or the appended claims. For example, while it is envisioned that the UWB frequency is preferred due to IEEE standardizations methods, the presently claimed invention can be used at frequencies significantly higher or lower than UWB (2-100 times/divisions) frequencies and any frequency using the system resides within the spirit of the invention and the scope of the appended claims. Therefore, the present invention is not limited to the above-described embodiments and drawings.

What is claimed is:

1. A high-speed WPAN (Wireless Personal Area Network) system, comprising:
   an optical fiber serving as a medium for transmitting data;
   a plurality of pico-nets each including a plurality of devices and a PNC (Pico-Net Coordinator) device for managing the devices;
   a plurality of two-way signal converters that correspond to the pico-nets, each of the two-way signal converters being adapted for converting an optical signal received from the optical fiber into an electrical signal and transmit the electrical signal to the pico-nets, and for converting an electrical signal received from each of the pico-nets into an optical signal to transmit the optical signal to the optical fiber; and
   a plurality of connectors attached to both the optical fiber and the two-way signal converters for transmitting signals input from the optical fiber and the signal converters bidirectionally,
   wherein one of the PNC devices provided in the plurality of pico-nets allocates and manages timeslots for all of the devices located in the plurality of pico-nets by logically integrating the plurality of pico-nets as a single pico-net.

2. The high-speed WPAN system as set forth in claim 1, wherein each one of the plurality of connectors comprises:
   a first coupler connected to one side of the optical fiber;
   a second coupler connected to the other side of the optical fiber; and
   a third coupler connected to the signal converter,
   wherein the first, second and third couplers are adapted to drop/add input signals.

3. The high-speed WPAN system as set forth in claim 2, wherein each of the first, second and third couplers comprises:
   a first port at one side thereof; and
   a second port at the other side thereof,
   wherein each of the first, second and third couplers drops and transmits a signal input from the first port to the second port, and adds and transmits signals input from the second port to the first port.

4. The high-speed WPAN system as set forth in claim 3, wherein the first port of the first and second couplets are connected to the optical fiber, and the first port of the third coupler is connected to the signal convener.

5. The high-speed WPAN system as set forth in claim 4, wherein the second port at each of the first, second and third couplers are mutually connected to second ports of neighboring couplers by common lines.

6. The high-speed WPAN system as set forth in claim 1, wherein the one PNC device designated to manage controls all the devices located in the plurality of pico-nets as a single logical pico-net.

7. The high-speed WPAN system as set forth in claim 6, wherein a higher-order device of PNC-capable devices is set as a PNC device when a location of the one PNC device that manages all the devices located in the plurality of pico-nets is arranged outside the single logical pico-net.

8. The high-speed WPAN system as set forth in claim 1, wherein the WPAN does not include a MAC bridge function.

9. A high-speed WPAN (Wireless Personal Area Network) system, comprising:
   an optical fiber serving as a medium for transmitting data;

a pico-net including at least one device and a PNC (Pico-Net Coordinator) device for managing the at least one device;

a two-way signal converter adapted for converting an optical signal received from the optical fiber into an electrical signal to transmit the electrical signal to the pico-net, and f0r converting an electrical signal received from the pico-net into an optical signal for transmission the optical fiber; and a connector connected to the optical fiber and the two-way signal converter for transmitting signals inputted from the optical fiber and the signal converters bidirectionally, wherein the PNC device provided in the pico-net allocates and manages timeslots for all the other devices located in other pico-nets that are attached to said pico-net and the optical fiber by the connector nets by logically integrating the plurality of pico-nets as a singe pico-net.

10. The high-speed WPAN system as set forth in claim 9, wherein the WPAN does not include a MAC bridge function.

11. A method for providing communications in a high-speed WPAN (Wireless Personal Area Network) system, comprising the steps of:

(a) designating an optical fiber serving as a medium for transmitting data;

(b) arranging a plurality of pico-nets each including a plurality of devices and a PNC (Pico-Net Coordinator) device in communication with the optical fiber medium for managing the devices;

(c) providing a plurality of two-way signal converters that correspond to each one of the pico-nets, each of the two-way signal converters being adapted for converting an optical signal received from the optical fiber into an electrical signal and transmit the electrical signal to the pico-nets, and for converting an electrical signal received from each of the pico-nets into an optical signal to transmit the optical signal to the optical fiber; and (d) attaching a plurality of connectors to both the optical fiber and the two-way signal converters for transmitting signals input from the optical fiber and the signal converters bidirectionally, and (e) designating one of the PNC devices provided in the plurality of pico-nets to allocate and manage timeslots for at least some of the devices located in the plurality of pico-nets nets by logically integrating the plurality of pico-nets as a single pico-net.

12. The method according to claim 11, wherein in step (e) the designated PNC device allocates and manages timeslots for all of the devices located in the plurality of pico-nets.

13. The method according to claim 11, wherein steps (a) through (e) do not include a step of adding a MAC bridge function.

14. A method for providing high-speed communications in a WPAN (Wireless Personal Area Network) system, comprising the steps of:

(a) designating an optical fiber serving as a medium for transmitting data;

(b) arranging a pico-net including at least one device and a PNC (Pico-Net Coordinator) device for managing the at least one device;

(c) providing a two-way signal converter adapted for converting an optical signal received from the optical fiber into an electrical signal to transmit the electrical signal to the pico-net, and for converting an electrical signal received from the pico-net into an optical signal for transmission the optical fiber; and (d) attaching a connector to the optical fiber and the two-way signal converter for transmitting signals inputted from the optical fiber and the signal converters bidirectionally, wherein the PNC device provided in the pico-net allocates and manages timeslots for all the other devices located in other pico-nets that are attached to said pico-net and the optical fiber by the connector nets by logically integrating the plurality of pico-nets as a singe pico-net.

15. The method according to claim 14, wherein steps (a) through (d) do not include a step of adding a MAC bridge function.

* * * * *